US012700322B2

(12) United States Patent
Rippe et al.

(10) Patent No.: US 12,700,322 B2
(45) Date of Patent: Aug. 4, 2026

(54) METHOD FOR AUTO POPULATING FLIGHT STATUS IN EVENT OF AIRCRAFT EMERGENCY

(71) Applicant: GOGO BUSINESS AVIATION LLC, Broomfield, CO (US)

(72) Inventors: Christopher Michael Rippe, Arvada, CO (US); Todd A. Krawcyzk, Boulder, CO (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 308 days.

(21) Appl. No.: 18/389,480

(22) Filed: Nov. 14, 2023

(65) Prior Publication Data

US 2025/0157344 A1 May 15, 2025

(51) Int. Cl.
*G08G 5/55* (2025.01)
*G08G 5/21* (2025.01)
*G08G 5/26* (2025.01)
*G08G 5/58* (2025.01)

(52) U.S. Cl.
CPC ................ *G08G 5/55* (2025.01); *G08G 5/21* (2025.01); *G08G 5/26* (2025.01); *G08G 5/58* (2025.01)

(58) Field of Classification Search
CPC .................................. G08G 5/21; G08G 5/26
See application file for complete search history.

(56) References Cited

U.S. PATENT DOCUMENTS 9,310,222 B1 4/2016 Suiter et al.
10,116,378 B1 10/2018 Morowsky et al.
10,741,085 B2 8/2020 Shorter, Jr. et al.
11,626,024 B2 4/2023 Shamasundar et al.
11,657,721 B1 * 5/2023 Suiter ..................... G08G 5/34
701/14
2011/0264312 A1 10/2011 Spinelli et al.
2012/0010806 A1 1/2012 Tseng
2016/0093217 A1 3/2016 Hale et al.
2016/0275260 A1 9/2016 Nguyen et al.

FOREIGN PATENT DOCUMENTS

EP 3422357 A1 1/2019

OTHER PUBLICATIONS

International Application No. PCT/US2024/054622, International Search Report and Written Opinion, mailed Feb. 19, 2025.

* cited by examiner

*Primary Examiner* — Wade Miles
*Assistant Examiner* — Zachary Joseph Wallace
(74) *Attorney, Agent, or Firm* — Holland & Hart LLP

(57) ABSTRACT

A computer-implemented method for retrieving flight data in a medical emergency includes receiving, by one or more processors of a first user device and via an application programming interface, an indication of a medical emergency aboard an aircraft; retrieving, by the one or more processors and responsive to receiving the indication of the medical emergency, flight data associated with the medical emergency from a flight management system associated with the aircraft; automatically categorizing, by the one or more processors, the retrieved flight data based at least on one or more flight data fields associated with the medical emergency to generate categorized flight data; and transmitting, by the one or more processors, at least some of the categorized flight data to a second user device external to the aircraft.

20 Claims, 7 Drawing Sheets

METHOD FOR AUTO POPULATING FLIGHT STATUS IN EVENT OF AIRCRAFT EMERGENCY

FIELD OF THE INVENTION

The present disclosure is related to methods and systems for auto populating flight status in the event of an aircraft emergency.

BACKGROUND

When there is a medical emergency aboard an aircraft, it is important to quickly and accurately retrieve information about flight status and communicate that information to medical personnel on the ground. This allows for the coordination of emergency medical services near a landing site such as an airport. Information about the flight and emergency is also important in order for crew aboard the aircraft to determine and perform an appropriate response for the emergency.

During a flight, however, it may be difficult to retrieve and communicate this information, as crew members aboard the aircraft may be preoccupied with other important flight functions. For example, a pilot in the cockpit would have access to the information, but would be busy flying the aircraft and may not be able to easily or quickly communicate the information with others. Additionally, crew members may be providing medical attention to the person experiencing the medical emergency. Moreover, relaying the information verbally could result in inaccuracies in the flight status information, as a listening party may not hear the information correctly or may be prone to other human touchpoint-focused errors. Accordingly, there is a need to develop systems and methods to quickly and accurately retrieve and communicate flight information that is important for responding to a medical emergency.

SUMMARY

The present aspects can relate to, inter alia, systems and methods for auto populating flight status in the event of an aircraft emergency.

In one aspect, a computer-implemented method for retrieving flight data in a medical emergency may be provided. The method may be implemented via one or more processors and other electronic or electrical components. In one instance, the computer-implemented method may include (1) receiving, by one or more processors of a first user device and via an application programming interface, an indication of a medical emergency aboard an aircraft; (2) retrieving, by the one or more processors and responsive to receiving the indication of the medical emergency, flight data associated with the medical emergency from a flight management system associated with the aircraft; (3) automatically categorizing, by the one or more processors, the retrieved flight data based at least on one or more flight data fields associated with the medical emergency to generate categorized flight data; and (4) transmitting, by the one or more processors, at least some of the categorized flight data to a second user device external to the aircraft.

In another aspect, a computer system for retrieving flight data in a medical emergency may be provided. The computer system may include one or more processors and one or more non-transitory memories. The one or more processors may be configured to (1) receive, via an application programming interface, an indication of a medical emergency aboard an aircraft; (2) retrieve, responsive to receiving the indication of the medical emergency, flight data associated with the medical emergency from a flight management system associated with the aircraft; (3) automatically categorize the retrieved flight data based at least on one or more flight data fields associated with the medical emergency to generate categorized flight data; and (4) transmit at least some of the categorized flight data to a second user device external to the aircraft.

In another aspect, a non-transitory computer-readable medium for retrieving flight data in a medical emergency may be provided. For example, the non-transitory computer-readable medium may include instructions to cause one or more processors to (1) receive, via an application programming interface, an indication of a medical emergency aboard an aircraft; (2) retrieve, responsive to receiving the indication of the medical emergency, flight data associated with the medical emergency from a flight management system associated with the aircraft; (3) automatically categorize the retrieved flight data based at least on one or more flight data fields associated with the medical emergency to generate categorized flight data; and (4) transmit at least some of the categorized flight data to a second user device external to the aircraft.

Advantages will become more apparent to those of ordinary skill in the art from the following description of the preferred aspects, which have been shown and described by way of illustration. As will be realized, the present aspects can be capable of other and different aspects, and their details are capable of modification in various respects. Accordingly, the drawings and description are to be regarded as illustrative in nature and not as restrictive.

BRIEF DESCRIPTION OF THE DRAWINGS

The figures depict embodiments of this disclosure for purposes of illustration only. One skilled in the art will readily recognize from the following discussion that alternate embodiments of the structures and methods illustrated herein may be employed without departing from the principles set forth herein. The figures are not to scale. Instead, they are drawn to clarify aspects of this disclosure. Connecting lines or connectors shown in the various figures presented are intended to represent example functional relationships, physical couplings, or logical couplings between the various elements. In general, the same reference numbers will be used throughout the drawing(s) and accompanying written description to refer to the same or like parts.

DETAILED DESCRIPTION

Figure 1A:
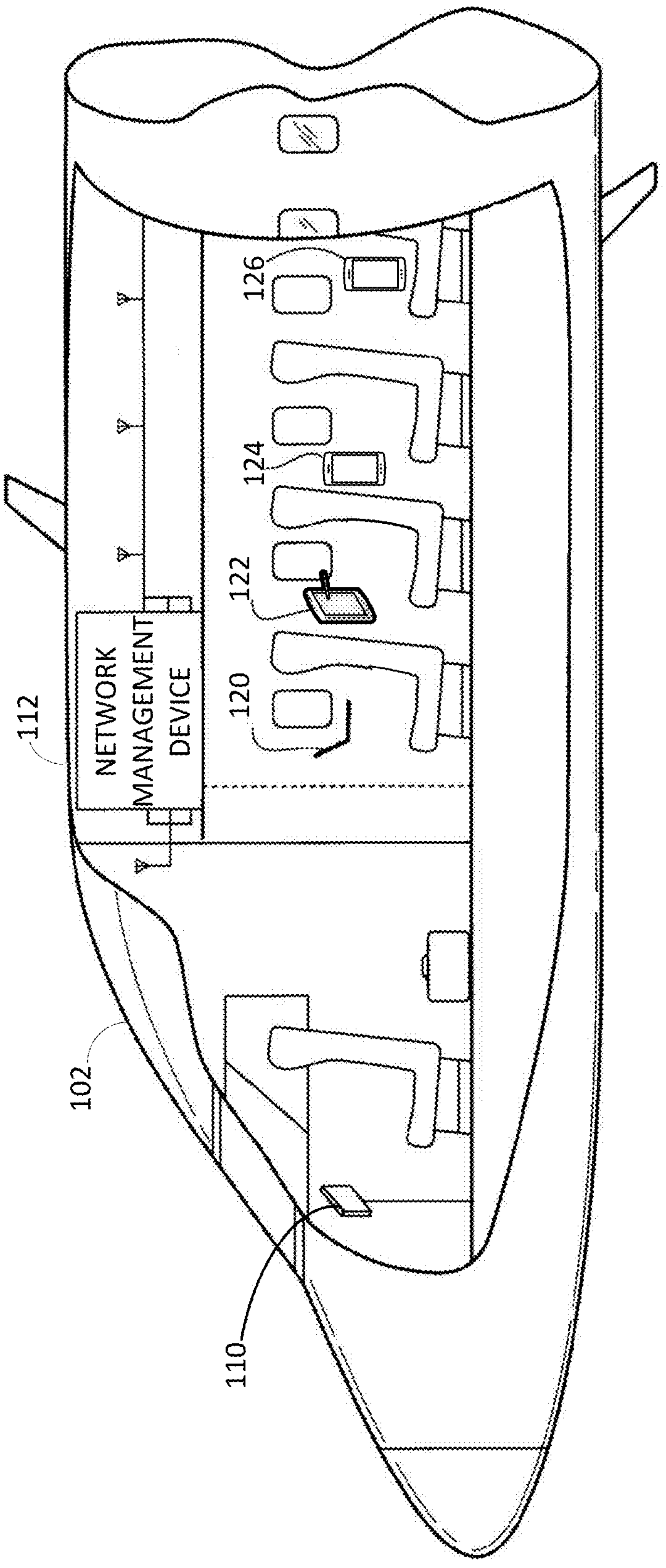
FIG. 1A depicts an aircraft communication network environment according to aspects of the present disclosure.

The embodiments described herein relate to techniques for auto populating flight status in the event of an aircraft emergency. In some aspects, a user may interact with an application on an electronic device to report a medical emergency has begun aboard the aircraft. The electronic device may retrieve flight status information from the flight management system via an application programming interface. The data may be automatically categorized into different data fields. Missing data may be calculated, and existing data may be recalculated. The flight status information may be transmitted to an electronic device external to the aircraft, such as one associated with medical personnel on the ground, in order to coordinate a response to the emergency. Additionally, recommendations for responding to the emergency may be provided.

In the event of a medical emergency aboard an aircraft it is important to communicate flight information quickly and accurately to make the best possible decisions for handling the emergency. However, it may be difficult to retrieve flight status information quickly and accurately. Crew members may be preoccupied with fulfilling their duties or with assisting with the medical emergency. The present techniques offer many advantageous improvements. In particular, the present techniques may use an API to retrieve flight status data directly from the flight management system. The use of an API to retrieve the flight data ensures that the data is accurate, as it comes directly from the aircraft's systems. The use of an API also lets the flight management system to efficiently interface and communicate with a diverse range of electronic devices. Values may be calculated for more accurate and up-to-date information, or for fields in which a flight management system has no data. Additionally, the recommendations for responding to the emergency may be better tailored for the medical emergency, as factors specific to the medical emergency may be considered, which provides the patient with care that best suits the particular emergency. Such recommendations may also minimize unnecessary flight interruption, as automatically generating recommendations may reduce the amount of time spent for the aircraft crew on making decisions for responding to the emergency. Additionally, unnecessary emergency response actions will be reduced or eliminated as the recommendations are tailored for a specific medical emergency.

Moreover, by interfacing the electronic device with the flight management system via the API, the system is able to access important information directly to make a more accurate decision faster. For example, by connecting the electronic device to the flight management system via the API, the system is able to directly access and populate flight data in addition to medical data, all of which is used to coordinate actions during an emergency. Similarly, the system may automatically update and/or adjust a flight plan, improving the overall system responsiveness. Improving response time for the system can improve the quality of care for a patient and can greatly reduce or remove the possibility of greater damage or death.

Reference will now be made in detail to the various embodiments and aspects of the present disclosure illustrated in the accompanying drawings. Wherever possible, the same or like reference numbers will be used throughout the drawings to refer to the same or like features. Certain terminology is used in the following description for convenience only and is not limiting.

Exemplary Communication Network Environment

Figure 1B:
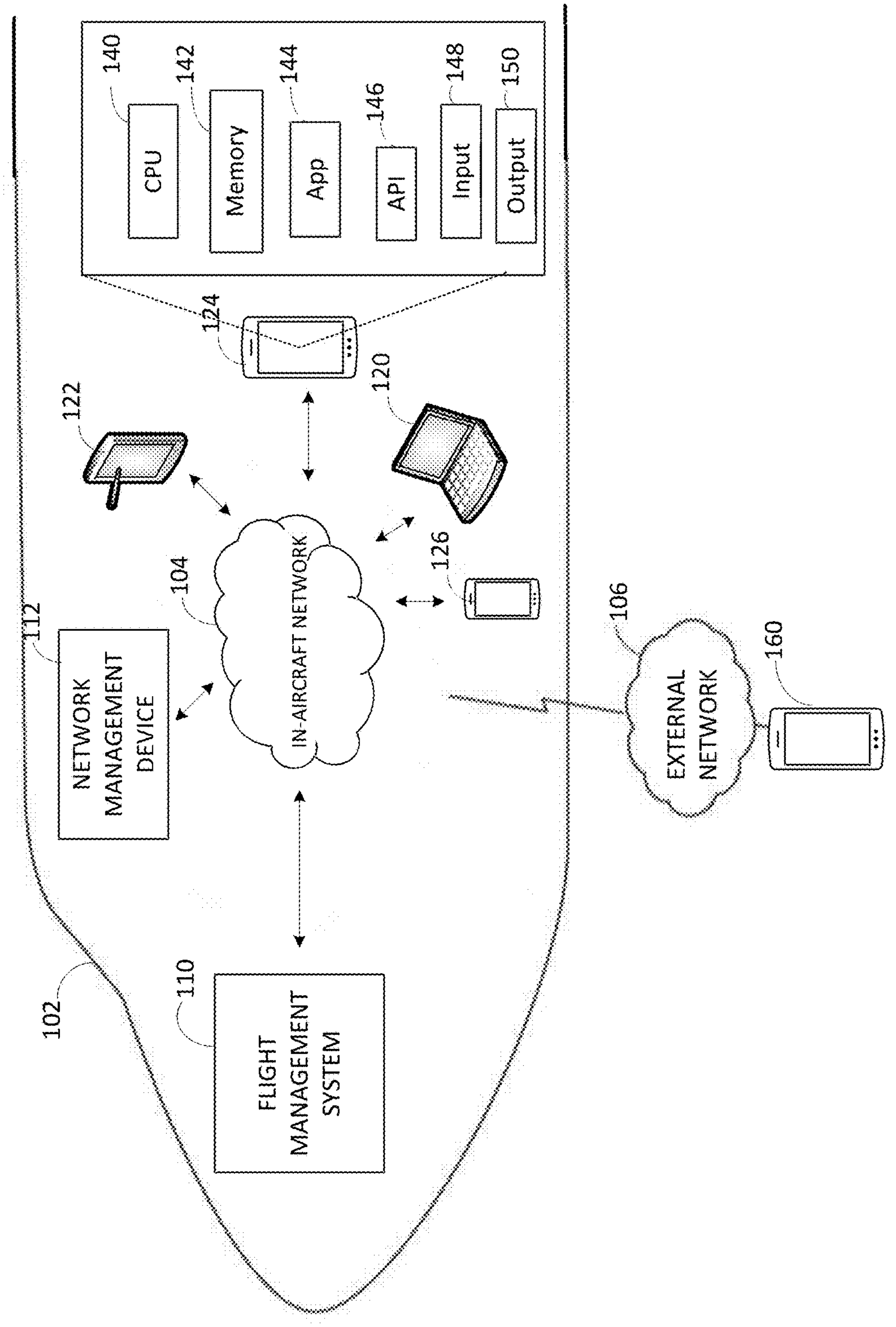
FIG. 1B depicts an aircraft communication network environment similar to FIG. 1A in more detail.

FIGS. 1A and 1B depict an aircraft communication network environment according to aspects of the present disclosure. While FIGS. 1A and 1B illustrate various components that can be included in the network environment, depicted components may be replaced with alternate versions, additional components can be added, and components which are illustrated can be removed.

As illustrated in FIGS. 1A and 1B, the network environment may include an aircraft 102, a flight management system 110, and a network management device 112. The aircraft 102 may include passengers who are using electronic devices 120, 122, 124, and 126. FIG. 1B depicts the vehicle communication network environment in further detail. As illustrated in FIG. 1B, the network environment may include an aircraft 102, flight management system 110, network management device 112, and electronic devices 120, 122, 124, 126, and 160. The flight management system, the network management device 112, and electronic device 124 may be communicatively coupled via an in-aircraft network 104. The in-aircraft network 104 may be connected to an external network 106. An electronic device 160 located externally to the aircraft may be connected to the external network 106. Electronic device 160 may communicate with devices 120, 122, 124, and 126 via networks 106 and 104.

The flight management system 110 may be a computer system installed in an aircraft 102. The flight management system 110 may communicate with or have control over other aircraft systems in the cockpit and throughout the aircraft 102. The flight management system 110 may receive data from sensors on the aircraft 102. For example, the flight management system 110 may receive data regarding aircraft speed, aircraft acceleration, an amount of fuel on the aircraft, latitude and longitude, altitude, weight on/off wheels, and/or other such flight data. The flight management system 110 may be a system configured to assist with controlling and/or make adjustments to the flight. For example, the flight management system 110 may manage a flight plan, fuel consumption, etc. As a further example, the flight management system 110 may cause changes in the actual operation of the flight (e.g., automatically and/or responsive to a command from a pilot). The flight management system 110 may communicate with aircraft systems and electronic devices aboard the aircraft, including electronic devices 120, 122, 124, and 126, via an in-aircraft network 104.

The electronic devices 120, 122, 124, 126, and 160 can be any type of electronic device with communication capabilities such as a mobile electronic device (e.g., a cell phone, a smart phone, a personal digital assistant (PDA), or a tablet, a laptop, an e-reader, a gaming console, smart glasses, a smart watch, a headset or other wearable device), a medical device with communication capabilities, or any other type of electronic device. For example, in FIG. 1A, device 120 is a laptop, device 122 is a tablet, and devices 124, 126, and 160 are mobile phones. In further implementations, the electronic devices 120, 122, 124, 126, and/or 160 may be or include medical equipment with which the flight management system 110 and/or another electronic device interfaces. In some such implementations, the flight management system 110 may poll information related to the medical emergency from the electronic device directly and/or via another electronic device as a relay. The electronic devices may be associated with passengers or with crew members. Electronic devices may be wired or connected to the in-aircraft network wirelessly.

An electronic device such as the electronic device 124 may include one or more processors 140. The processors 140 may include one or more suitable processors (e.g., central processing units (CPUs) and/or graphics processing units (GPUs)). The processor 140 may be connected to a memory 142 in order to execute software instructions stored in the memory 142.

The memory 142 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 142 may store an operating system (OS) (e.g., Microsoft Windows, Linux, UNIX, etc.) capable of facilitating the functionalities, apps, methods, or other software as discussed herein. The memory 142 may store sets of computer-executable instructions to implement the methods as described herein.

The memory 142 of electronic device 124 may include and/or store data for an application (app) 144 with which a user of the electronic device 124 may interact with to facilitate retrieving flight data from a flight management system. The application may be downloaded on electronic devices belonging to aircraft crew or passengers. The application may communicate with the flight management system 110 via an API 146 to retrieve flight data and display the flight data on the electronic device 124. The application may also calculate unknown flight data values and recalculate known flight data values. The application 144 may also facilitate the communication of the flight data from the electronic device 124 aboard the aircraft to the electronic device 160 external to the aircraft.

The electronic device 124 may include an application programming interface (API) 146 by which a user of the electronic device 124 may use to retrieve flight data. The API 124 may be implemented as an endpoint accessible via a web service protocol, such as representational state transfer (REST), Simple Object Access Protocol (SOAP), JavaScript Object Notation (JSON), etc.

The electronic device 124 may include an input component 148 and output component 150 that allow the user to provide input to and perceive outputs of the electronic device 124. The input component may include a keyboard or a microphone. The output component may be a display and may include any suitable display technology (e.g., LED, OLED, LCD, etc.) for displaying information. In some implementations, the input component 148 and output component 150 may be integrated (e.g., in a touchscreen display) or may be separate. A user may use the input component 148 and output component 150 to retrieve flight status data, view flight status data, input flight data, make changes to flight data, initiate transmission of flight data, and perform other functions.

The network management device 112 may be used to facilitate communication between devices aboard an aircraft 102 (e.g., flight management system 110 and electronic devices 120, 122, 124, and 126) and between devices aboard an aircraft and devices external to the aircraft 102 (e.g., electronic device 160). The network management device 112 may manage the communication capabilities of devices aboard an aircraft. The network management device 110 may include or more servers, cloud computing devices such as routers, switches, network appliances, etc.

Exemplary User Interface

Figure 2A:
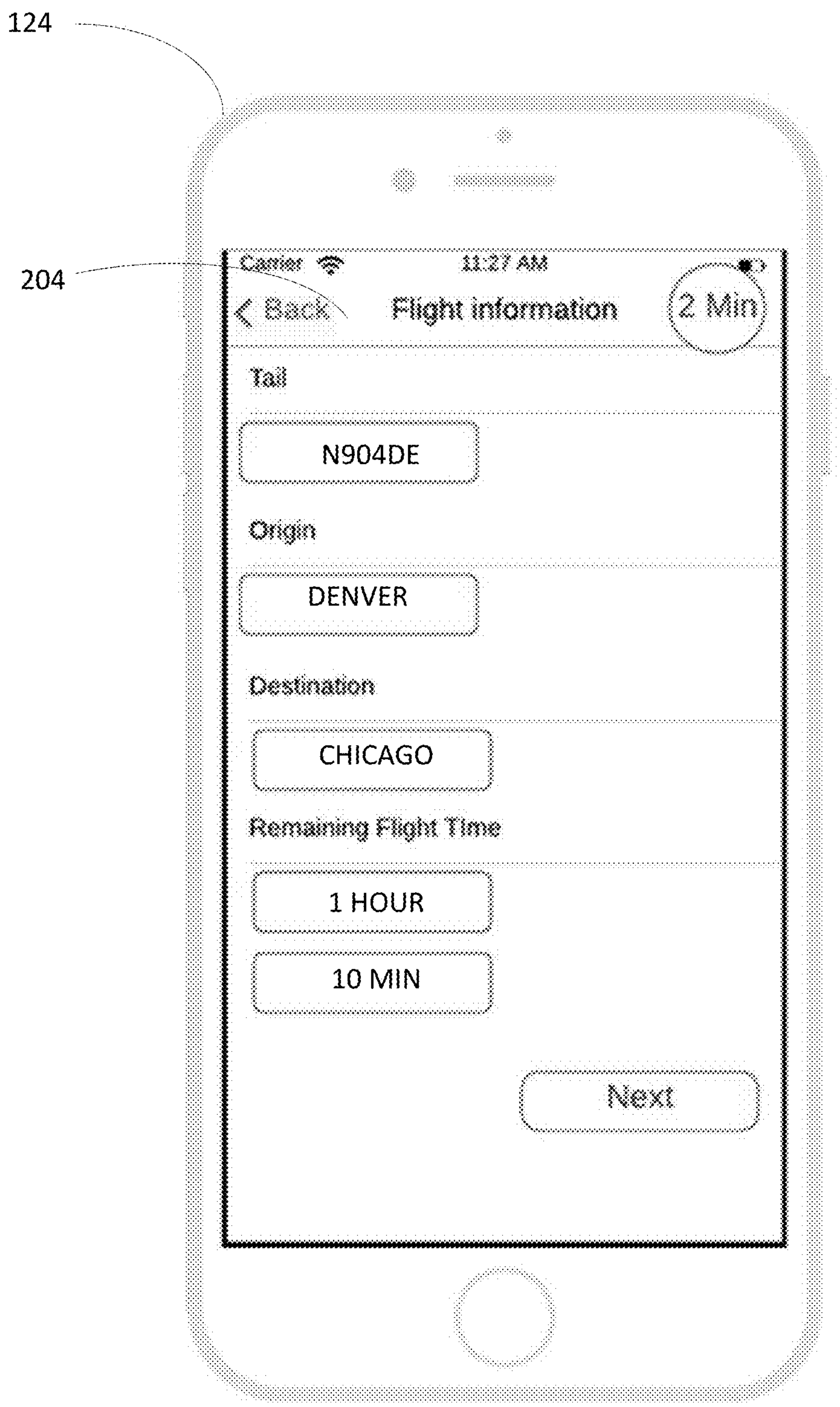
FIG. 2A depicts an example user interface of an application that receives flight status data from a flight management system according to aspects of the present disclosure.
Figure 2B:
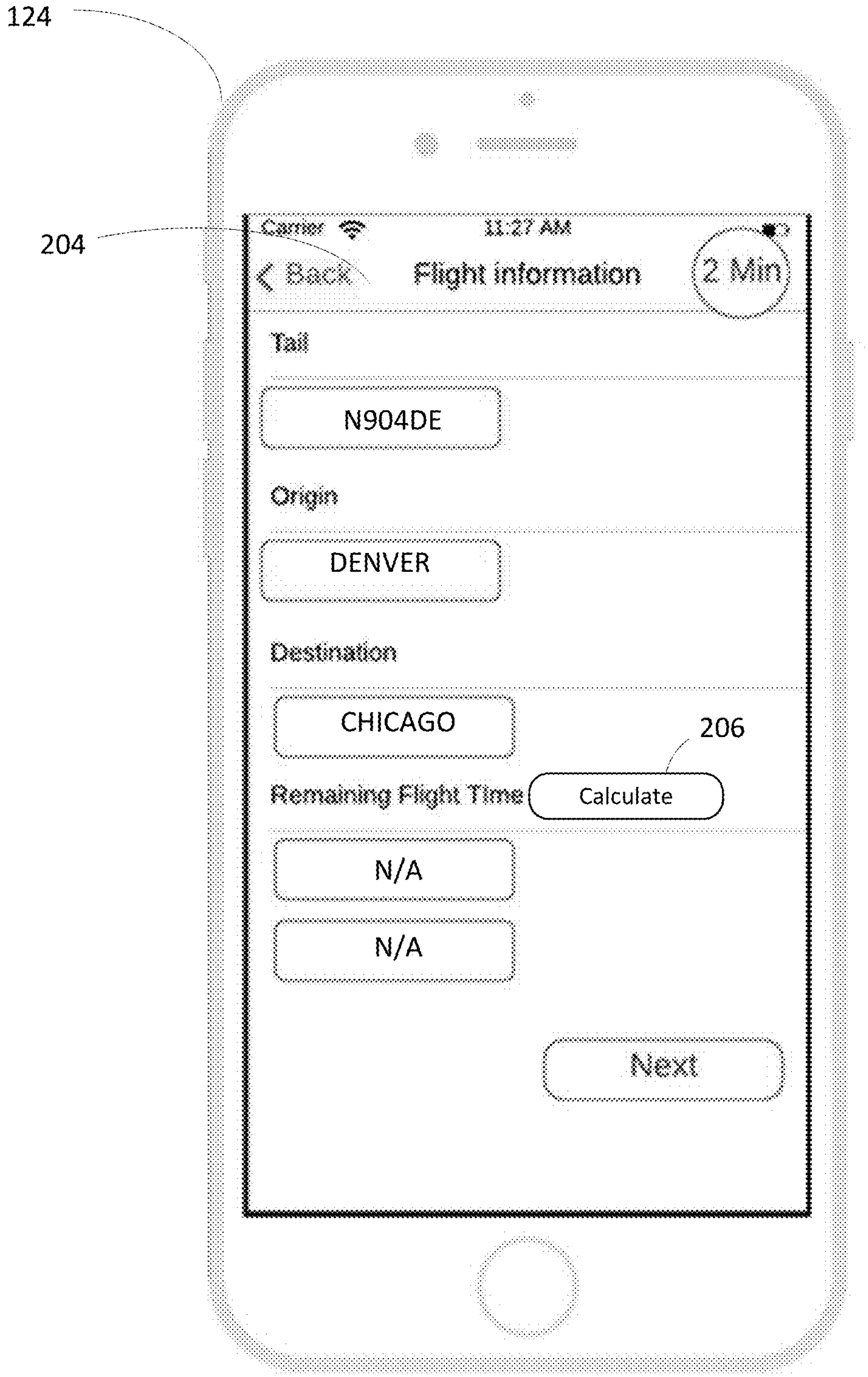
FIG. 2B depicts an example user interface of an application that receives flight status data from a flight management system similar to FIG. 2B, but in which not all flight data is able to be retrieved.
Figure 2C:
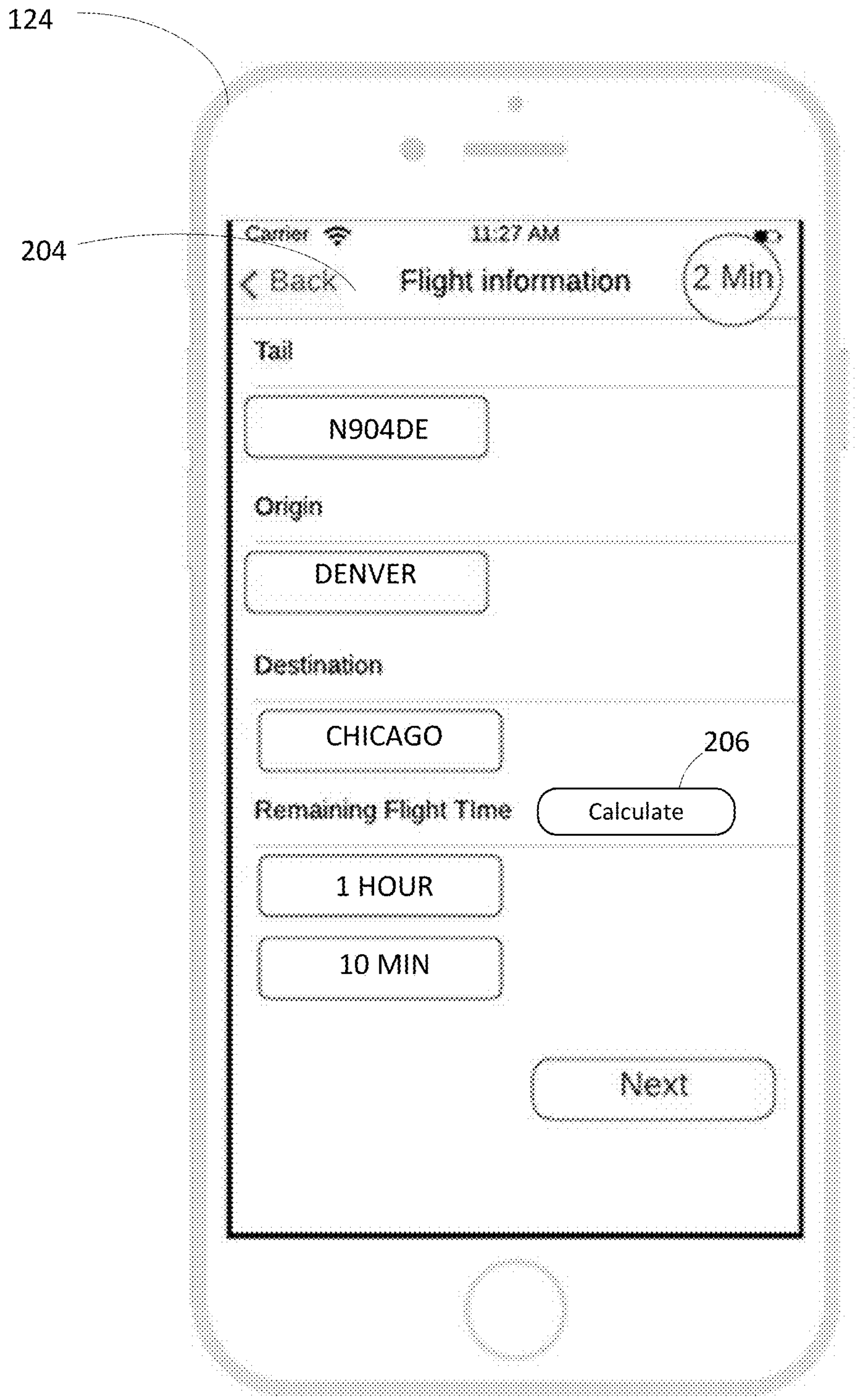
FIG. 2C depicts an example user interface of an application that receives flight status data from a flight management system similar to FIGS. 2A and 2B, but in which there is an option to recalculate flight data.

FIGS. 2A-2C depict exemplary user interfaces of an application such as application 144 for retrieving flight data running on an electronic device 124. The user interface may be displayed on an output component such as output component 150 of electronic device 124 as shown in FIG. 1B.

FIG. 2A depicts a user interface 204 provided by an application 144 after the electronic device 124 has retrieved flight data from a flight management system such as flight management system 110 in FIGS. 1A and 1B. The flight management system 110 may have received flight data, such as aircraft speed, altitude, amount of fuel remaining, etc., from sensors on the aircraft 102. The application 144 may be used by either an aircraft crew member or a passenger. The electronic device 124 retrieves the data using an API such as the API 146 in FIG. 1B. The flight data may include data such as an aircraft tail number, an origin airport, a destination airport, a present position of the aircraft, a present speed of the aircraft, an estimated time of arrival to the destination airport, any other data that may be relevant to communicate during an emergency event aboard an aircraft. The flight data may be categorized into different fields as shown in FIG. 2A. In FIG. 2A, the flight data includes the aircraft tail number ("N904DE"), the origin of the flight ("DENVER"), the destination of the flight ("CHICAGO"), and the remaining flight time (e.g., in hours and minutes ("1 HOUR;" "10 MIN")). In the exemplary embodiment of FIG. 2A, flight data corresponding to all of the requested data fields was retrieved from the flight management system.

In one aspect, the electronic device 124 may not be able to retrieve data for all of the requested data fields, as shown in FIG. 2B. For example, the flight data may not be listed in the flight management system, or may otherwise exist but not be associated with any particular label or identifier. In FIG. 2B, the electronic device 124 is able to retrieve flight status data, including the aircraft tail number, origin, and destination, via an API 146, much like in FIG. 2A. However, the electronic device 124 is unable to retrieve data for the remaining flight time, as shown by "N/A" under the "Remaining Flight Time" fields. When the electronic device 124 is unable to retrieve flight data corresponding to a data field, the electronic device 124 may calculate a value for that empty data field. In one aspect, the user of electronic device 124 may be able to interact via the user interface 204 prompt the API 146 to calculate missing values. In FIG. 2B, the user interface 204 includes a "calculate" icon 206. The "calculate" icon may be responsive to user interaction and may appear beside any data field missing an associated flight data value. A user may interact with (e.g., tap or click on) the "calculate" icon 206 to prompt the API 146 to calculate, using other retrieved flight data values (e.g., the destination, a current position of the aircraft, and a current flight speed), a remaining flight time for the flight. Alternately, the API 146 may automatically calculate a flight data value for a data field without a corresponding flight data value without any further input from the user of the electronic device 124. In further such implementations, the API 146 may determine that a value cannot be gathered and/or calculated, and may subsequently generate a notification and/or other such prompt for a user (e.g., a crew member) to input particular values manually.

In another aspect, the API 146 may be able to retrieve data for all of the requested data fields, but may nevertheless calculate or offer the option to calculate a new flight data value to replace an existing flight data value, as depicted in FIG. 2C. In FIG. 2C, the API 146 was able to retrieve data for the aircraft tail number, origin, destination, and remaining flight time, similar to FIG. 2A. However, in FIG. 2C, the user interface includes a "calculate" icon 206 beside the "Remaining Flight Time" fields. Although the API 146 was already able to retrieve values from the flight management system 110, the API may calculate new values for the remaining flight time. Like in FIG. 2C, the user may interact with the "calculate" icon 206 to calculate values for the remaining flight time. The user may interact with the "calculate" icon 206 by using an input component such as input component 148 as shown in FIG. 1B (e.g., tapping an interactive display screen). After the API 146 has calculated new flight data values using other retrieved flight data values, the new flight data values will replace the existing flight data values in the "Remaining Flight Time" fields. Alternately, the API 146 may automatically calculate a new flight data value to replace an existing value without any further input from the user of the electronic device 124.

Exemplary Methods of Retrieving Flight Data

Figure 3A:
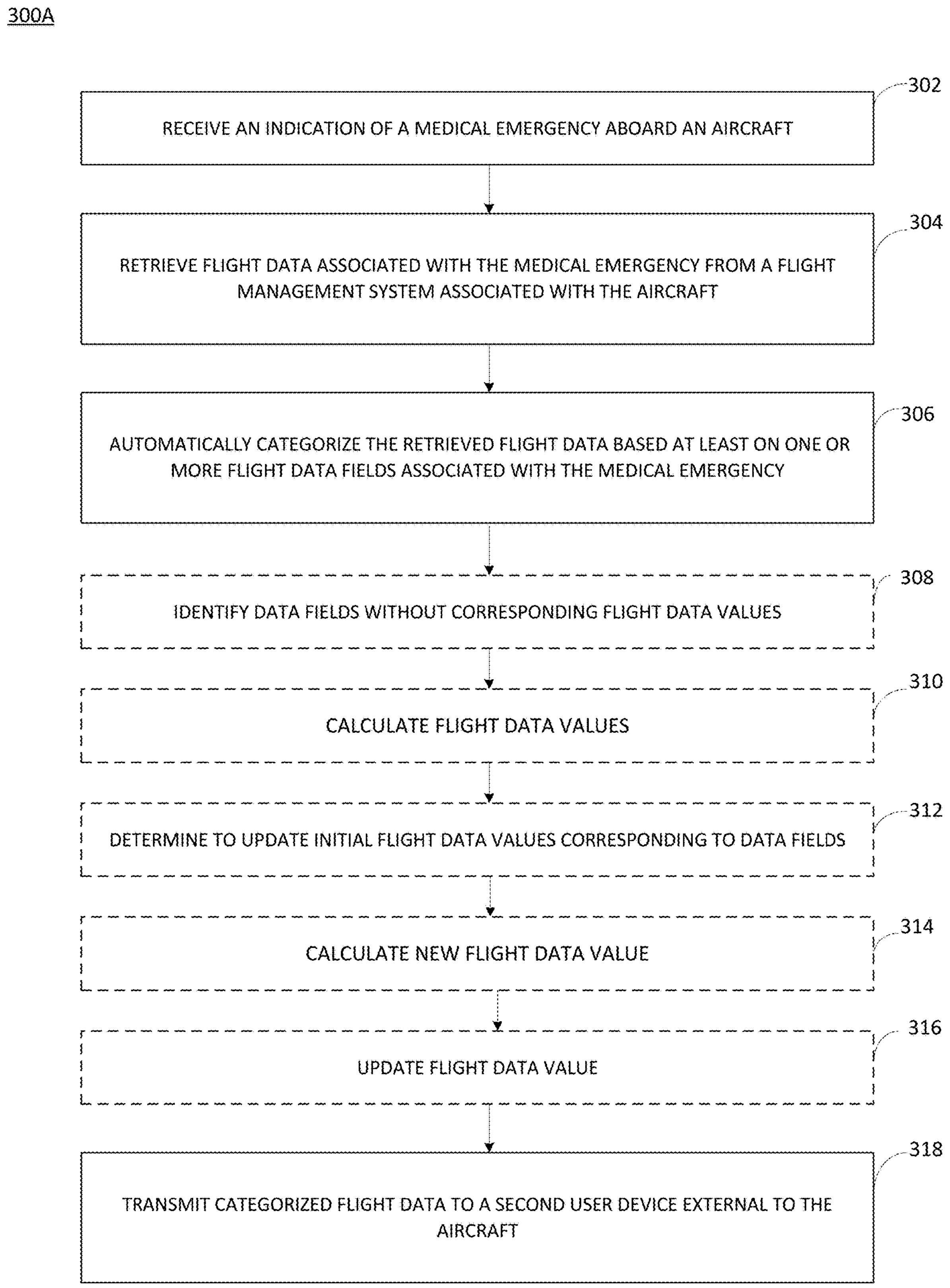
FIG. 3A is a flow diagram of an example method for retrieving flight data in a medical emergency.
Figure 3B:
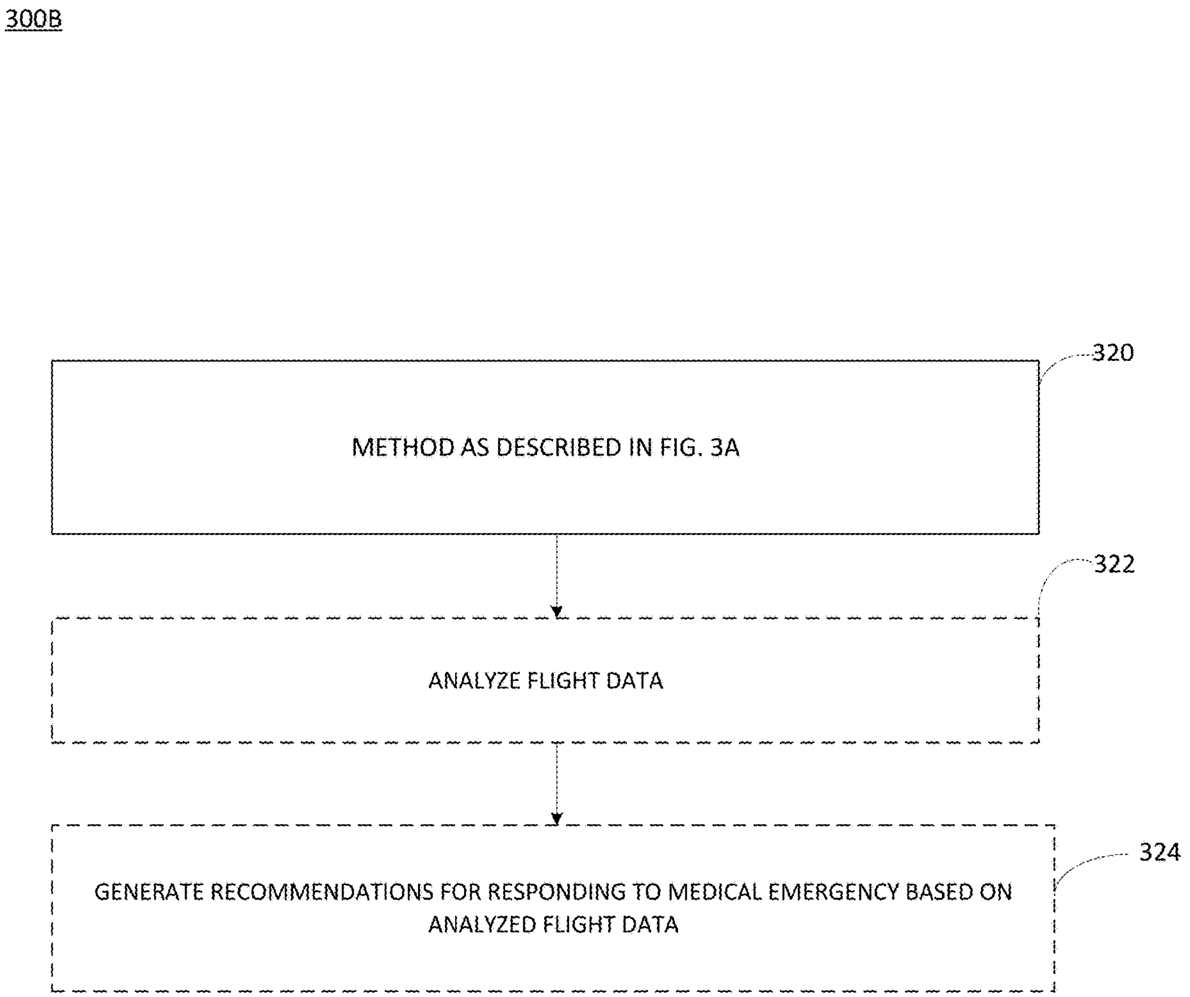
FIG. 3B is a flow diagram of an example method for retrieving flight data in a medical emergency similar to FIG. 3A, but also including suggestions for responding to the medical emergency.

FIGS. 3A and 3B depict flow diagrams of example methods for retrieving flight data in a medical emergency. One or more steps of the computer-implemented methods of 300A and 300B may be implemented as a set of instructions stored on a computer-readable memory and executable on one or more processors. The computer-implemented methods 300A and 300B may operate in the environment illustrated in FIGS. 1A and 1B.

FIG. 3A depicts an example method 300A for retrieving flight data in an aircraft emergency. The method may be performed by an electronic device such as electronic device 124 in FIG. 1B.

At block 302, an electronic device 124 may receive an indication of a medical emergency aboard an aircraft such as aircraft 102 as shown in FIGS. 1A and 1B. A user of the electronic device 124 may interact with the electronic device 124 via a user interface provided by an application such as application 144 in FIG. 1B.

At block 304, an API such as API 146 as shown in FIG. 1B calls the flight management system 110 to retrieve flight data associated with medical emergency from the flight management system 110 of aircraft 102. The flight management system 110 may receive data from sensors on the aircraft 102 such as aircraft speed, aircraft acceleration, an amount of fuel on the aircraft, latitude and longitude, altitude, weight on/off wheels, and/or other such flight data. The request is transmitted over the in-aircraft network 104 to the flight management system 110. The requested flight data may be an aircraft tail number, an origin airport, a destination airport, a present position of the aircraft, a present speed of the aircraft, an estimated time of arrival to a destination airport, or any other information that may be important to communicate in a medical emergency.

At block 306, the API 146 automatically categorizes the retrieved flight data into one or more flight data fields. The retrieved flight data values correspond to flight data fields. Some flight data values may already be labeled with a data field in the flight management system. Some flight data values may be unlabeled, and thus the API 146 may determine the data field to which each unlabeled flight data value corresponds. In one aspect, the categorization of the flight data may be shown by displaying the flight data values in boxes with a corresponding flight data field label on a user interface.

In one aspect, the API 146 may identify empty data fields, as shown at option block 308. Some flight management systems may not have all of the requested flight data. As such, after all retrieved data has been categorized, some data fields may not have corresponding flight data values.

In one aspect, the API 146 may calculate flight data values for flight data fields that do not have a corresponding flight data value, as shown at block 310. The API 146 may calculate flight data values using other retrieved flight data values. In some implementations, the API 146 may automatically calculate some or all of the missing flight data values. In other implementations, a user manually prompt calculation of some or all of the missing values by interacting with the application 144 via an input component 148 (e.g., touchscreen, keyboard). The user may also choose to manually enter some or all of the flight data values that cannot be calculated or retrieved from flight management system 110 by interacting with the application 144 via an input component 148 (e.g., touchscreen, keyboard).

The API 146 may determine to update initial flight data values corresponding to data fields, as shown at block 312. In one aspect, some data fields may have corresponding flight data values after the flight data has been retrieved from the flight management system 110. In some implementations, the API 146 may automatically determine to calculate a new value based on other flight data retrieved from the flight management system 110. For example, an estimated amount of time left in a flight may be entered, but a new estimated amount of time left in a flight may be calculated from other flight data of the aircraft such as a present position, destination, and speed. In other implementations, a user may interact with the electronic device 124 to prompt recalculation of flight data values.

In some implementations, at block 314, the API 146 may calculate a new flight data value that was initially retrieved from the flight management system 110 for a corresponding data field. For example, the API 146 may calculate a new value for an estimated amount of time left in a flight by using flight data of the aircraft such as a present position, destination, and speed.

In some implementations, at block 316, the API 146 may update flight data value by replacing the initial flight data value and associating the flight data field with the new flight data value. For example, this may be seen on a user interface 204 by removing the old value from a box with a corresponding field label and placing the new value into the box.

At block 318, the electronic device 124 may transmit categorized flight data to another electronic device external to the aircraft 102, such as electronic device 160 in FIG. 1B. The electronic device 124 may communicate the flight data important for responding to the medical emergency to emergency services on the ground. The flight data may be communicated to the external electronic device 160 through an external network 106. In some implementations, the electronic device 124 may facilitate communications with the medical personnel on the ground. The electronic device 124 may also transmit medical information about the patient to electronic device 160. Medical personnel may use electronic device 160 to transmit instructions or recommendations to electronic device 124. In further implementations, the electronic device 124 may query an on-board database and/or the electronic device 160 (e.g., via the API) for medical information and/or medical instructions.

Method 300B of FIG. 3B begins with the same steps as method 300A of FIG. 3A. The block 320 is the same as blocks 302-318 of method 300A for retrieving and transmitting flight data. In some implementations, at block 322, the electronic device 124 may analyze the flight data retrieved from the flight management system 110. In some implementations, at block 322, the electronic device 124 and/or flight management system 110 may generate one or more recommendations via an application, such as application 144 as shown in FIG. 1B for responding to the medical emergency based on the analyzed flight data. For example, the flight management system 110 and/or electronic device 124 may generate and/or provide a recommendation to land. In some implementations, the flight management system 110 and/or electronic device 124 may automatically communicate a new landing location to electronic device 160. In some implementations, the flight management system 110 may automatically implement the recommendation.

In some implementations, to generate recommendations for responding to the emergency, the flight management system 110 and/or electronic device 124 may use API 146 to retrieve medical information from an electronic device 160 associated with a doctor. Additionally or alternatively, the flight management system 110 and/or electronic device 124, may use API 146 to retrieve information from a database for information for responding to the medical emergency, or if electronic device 124 is unable to connect with a doctor. In some implementations, the flight management system 110 and/or electronic device 124 may consider the types of medical equipment onboard to generate recommendations for responding to the medical emergency. Depending on the implementation, the flight management system 110 and/or electronic device 124 may generate a recommendation based on flight data (e.g., present position, estimated time of arrival, etc.), medical information (e.g., heartrate, blood pressure, etc.), categorization of the emergency (e.g., medical criticality), etc. in generating the recommendation.

In some implementations, the flight management system and/or electronic device 124 uses a trained machine learning model in generating one or more recommendations. For example, the electronic device 124 may use a machine learning model trained on historical data and/or test data of responses to medical emergencies aboard an aircraft. Depending on the implementation, the machine learning model may be trained using supervised techniques, unsupervised techniques, semi-supervised techniques, reinforcement techniques, etc. Similarly, although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. For example, the machine-learning techniques may be implemented automatically upon receiving an indication that an emergency has begun aboard an aircraft. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing medical data, flight data, and emergency response data in order to facilitate making predictions for responding to medical emergencies occurring aboard an aircraft. Models may be created based upon example inputs of data in order to make valid and reliable predictions for novel inputs.

Additionally or alternatively, the machine learning programs may be trained by inputting sample data sets or certain data into the programs, such as aircraft sensor data, user device data, historical cleaned/anonymized medical data, and other data discussed herein. The machine learning programs may utilize deep learning algorithms that are primarily focused on pattern recognition and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. For example, the processing element may be provided with an example medical emergency occurring aboard an aircraft during a phase of a flight and an associated recommendation for responding to the emergency. In unsupervised machine learning, the processing element may be required to find its own structure in unlabeled example inputs. In one embodiment, machine learning techniques may be used to extract the control signals generated by computer systems or sensors (e.g., aircraft sensors, medical sensors), and under what conditions those control signals were generated.

After training, machine learning programs (or information generated by such machine learning programs) may be used to evaluate additional data. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

In some implementations, the electronic device 124 may also consider a categorization of medical emergency. For example, a critical emergency (e.g., life-threatening) may generate different recommendations than a less serious emergency. In response to a critical emergency, the electronic device 124 may generate a recommendation to land at a location close to a hospital, while a less serious emergency may generate a recommendation to treat the patient on board and continue to fly to the intended destination. Alternately, the electronic device 124 may generate a recommendation to land immediately at a site where there is no nearby hospital and arrange for an emergency response team to meet at the landing site. In another example, a cardiac-related emergency may generate different recommendations than a neurological-related emergency.

Additionally or alternatively, the electronic device 124 may generate a recommendation including a hospital recommendation via application 144. For example, the electronic device 124 may generate a hospital recommendation of hospitals nearby airports that are close to the present position of aircraft 102, a hospital that specializes in a specific type of a medical emergency, a hospital that has doctors capable of handling a specific type of medical emergency, or a hospital that has adequate resources for responding to the emergency. For example, the electronic device 124 may generate a hospital recommendation of a hospital with an ophthalmologist for an eye-related emergency rather than a hospital that does not have an ophthalmologist. In another example, the electronic device 124 may generate a hospital recommendation of a hospital that specializes in cardiology for a cardiac-related emergency to provide a better quality of care for the patient over a hospital that does not specialize in cardiology that would provide a lesser quality of care for the patient. In another example, the electronic device 124 may recommend a hospital that is closest to the current position of the aircraft to treat a life-threatening emergency such as a heart attack. In another example, the electronic device 124 may receive information from electronic device 160 that the emergency room at the hospital closest to the current location of the aircraft is at capacity, and thus generate a hospital recommendation of a hospital whose emergency room is below capacity but is not the closest hospital to the current location of the aircraft. In still another example, the electronic device 124 may additionally communicate information with systems and/or devices for emergency services (e.g., an ambulance, fire truck, etc.) to generate a schedule for assistance from such services (e.g., at the expected time of landing for the aircraft).

Additional Considerations

As used herein, the terms "receive," "received," and "receiving" may refer to collecting performance metrics transmitted by an on-board node and/or base station or retrieving the performance metrics from the on-board node and/or base station. It will be appreciated that the term receive is not limited to these examples only and may have alternative, different and/or other features and still fall within the scope of present disclosure.

As used herein, the terms "meter," "metered," and "metering" may refer to allocating bandwidth limits or enforcing the bandwidth limits. It will be appreciated that the term meter is not limited to these examples only and may have alternative, different and/or other features and still fall within the scope of present disclosure.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way but may also be configured in ways that are not listed.

Further, as used herein, the expressions "in communication," "coupled" and "connected," "communicatively coupled," etc. including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The communication systems and methods described herein are directed to improvements to computer and communication system functionality and performance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

This detailed description is to be construed as exemplary only and does not describe every possible embodiment, as describing every possible embodiment would be impractical, if not impossible. One could implement numerous alternate embodiments, using either current technology or technology developed after the filing date of this application. By way of example, and not limitation, the disclosure herein contemplates at least the following aspects:

Aspect 1. A computer-implemented method for retrieving flight data in a medical emergency, the method comprising: receiving, by one or more processors of a first user device and via an application programming interface, an indication of a medical emergency aboard an aircraft; retrieving, by the one or more processors and responsive to receiving the indication of the medical emergency, flight data associated with the medical emergency from a flight management system associated with the aircraft; automatically categorizing, by the one or more processors, the retrieved flight data based at least on one or more flight data fields associated with the medical emergency to generate categorized flight data; and transmitting, by the one or more processors, at least some of the categorized flight data to a second user device external to the aircraft.

Aspect 2. The computer-implemented method of aspect 1, further comprising: identifying, by the one or more processors of the first user device and after automatically categorizing the retrieved flight data, one or more data fields without corresponding flight data values; and calculating, by the one or more processors of the first user device, the flight data values corresponding to the one or more data fields.

Aspect 3. The computer-implemented method of aspect 1, further comprising: determining, by the one or more processors of the first user device, to update at least one initial flight data value corresponding to one or more data fields; calculating, by the one or more processors of the first user device, at least one new flight data value corresponding to the one or more data fields; and updating, by the one or more processors of the first user device, the at least one initial flight data value with the at least one new flight data value.

Aspect 4. The computer-implemented method of aspect 1, wherein the flight data includes one or more of: (i) an aircraft tail number; (ii) an origin airport; (iii) a destination airport; (iv) a present position of the aircraft; (v) a present speed of the aircraft; or (vi) an estimated time of arrival to the destination airport.

Aspect 5. The computer-implemented method of aspect 1, wherein the second user device includes at least one of: (i) a ground-based server, (ii) an electronic device associated with a medical professional, (iii) an electronic device associated with emergency personnel, or (iv) an electronic device associated with an airport.

Aspect 6. The computer-implemented method of aspect 1, further comprising: analyzing, by the one or more processors of the first user device, the flight data associated with the medical event; and generating, by the one or more processors of the first user device, at least one recommendation for responding to the medical emergency, wherein the recommendation is based on the analyzed flight data.

Aspect 7. The computer-implemented method of aspect 6, wherein the recommendation is further based on a categorization of the medical emergency.

Aspect 8. The computer-implemented method of aspect 6, wherein generating at least one recommendation for responding to the medical emergency includes generating a hospital recommendation for rerouting a flight path of the aircraft.

Aspect 9. A computer system for retrieving flight data in a medical emergency, the system comprising: one or more processors; and a memory storing instructions that, when executed, cause the one or more processors to: receive, via an application programming interface, an indication of a medical emergency aboard an aircraft; retrieve, responsive to receiving the indication of the medical emergency, flight data associated with the medical emergency from a flight management system associated with the aircraft; automatically categorize the retrieved flight data based at least on one or more flight data fields associated with the medical emergency to generate categorized flight data; and transmit at least some of the categorized flight data to a second user device external to the aircraft.

Aspect 10. The computer system of aspect 9, wherein the memory includes instructions that, when executed, further cause the one or more processors to: identify, after automatically categorizing the retrieved flight data, one or more data fields without corresponding flight data values; and calculate the flight data values corresponding to the one or more data fields.

Aspect 11. The computer system of aspect 9, wherein the memory includes instructions that, when executed, further cause the one or more processors to: determine to update at least one initial flight data value corresponding to one or more data fields; calculate at least one new flight data value corresponding to the one or more data fields; and update the at least one initial flight data value with the at least one new flight data value.

Aspect 12. The computer system of aspect 9, wherein the flight data includes one or more of: (i) an aircraft tail number; (ii) an origin airport; (iii) a destination airport; (iv) a present position of the aircraft; (v) a present speed of the aircraft; or (vi) an estimated time of arrival to the destination airport.

Aspect 13. The computer system of aspect 9, wherein the second user device includes at least one of: (i) a ground-based server; (ii) an electronic device associated with a medical professional; (iii) an electronic device associated with emergency personnel, or (iv) an electronic device associated with an airport.

Aspect 14. The computer system of aspect 9, wherein the memory includes instructions that, when executed, further cause the one or more processors to: analyze the flight data associated with the medical event; and generate at least one recommendation for responding to the medical emergency, wherein the recommendation is based on the analyzed flight data.

Aspect 15. The computer system of aspect 14, wherein the recommendation is further based on a categorization of the medical emergency.

Aspect 16. The computer system of aspect 14, wherein generating at least one recommendation for responding to the medical emergency includes generating a hospital recommendation for rerouting a flight path of the aircraft.

Aspect 17. A non-transitory computer-readable medium storing processor-executable instructions for retrieving flight data in a medical emergency that, when executed by one or more processors, cause the one or more processors to: receive, via an application programming interface, an indication of a medical emergency aboard an aircraft; retrieve, responsive to receiving the indication of the medical emergency, flight data associated with the medical emergency from a flight management system associated with the aircraft; automatically categorize the retrieved flight data based at least on one or more flight data fields associated with the medical emergency to generate categorized flight data; and transmit at least some of the categorized flight data to a second user device external to the aircraft.

Aspect 18. The non-transitory computer-readable medium of aspect 17, storing further instructions to: identify, after automatically categorizing the retrieved flight data, one or more data fields without corresponding flight data values; and calculate the flight data values corresponding to the one or more data fields.

Aspect 19. The non-transitory computer-readable medium of aspect 17, storing further instructions to: determine to update at least one initial flight data value corresponding to one or more data fields; calculate at least one new flight data value corresponding to the one or more data fields; and update the at least one initial flight data value with the at least one new flight data value.

Aspect 20. The non-transitory computer-readable medium of aspect 17, storing further instructions to: analyze the flight data associated with the medical event; and generate at least one recommendation for responding to the medical emergency, wherein the recommendation is based on the analyzed flight data.

Aspect 21. The non-transitory computer-readable medium of aspect 20, wherein the recommendation is further based on a categorization of the medical emergency.

Aspect 22. The non-transitory computer-readable medium of aspect 20, wherein the instructions for generating at least one recommendation for responding to the medical emergency include instructions for generating a hospital recommendation for rerouting a flight path of the aircraft.

Aspect 23. The non-transitory computer-readable medium of aspect 17, wherein the second user device includes at least one of: (i) a ground-based server, (ii) an electronic device associated with a medical professional, (iii) an electronic device associated with emergency personnel, or (iv) an electronic device associated with an airport.

What is claimed:

1. A computer-implemented method, comprising:

receiving, by one or more processors of a first user device that is on-board an aircraft and via an application programming interface, an indication of a medical emergency aboard the aircraft;

retrieving, by the one or more processors from a flight management system that is on-board the aircraft and responsive to receiving the indication of the medical emergency, flight data associated with the aircraft at a time of the medical emergency;

automatically categorizing, by the one or more processors, the retrieved flight data based at least on one or more flight data fields associated with the medical emergency to generate categorized flight data;

displaying, by the one or more processors via a user interface of the first user device and responsive to receiving the indication of the medical emergency, the one or more flight data fields comprising the categorized flight data, each flight data field of the one or more flight data fields labeled with a respective flight data field label on the user interface, the one or more flight data fields comprising a present position of the aircraft and a present speed of the aircraft at the time of the medical emergency; and transmitting, by the one or more processors, at least some of the categorized flight data to a second user device external to the aircraft.

2. The computer-implemented method of claim 1, further comprising:

identifying, by the one or more processors of the first user device and after automatically categorizing the retrieved flight data, one or more data fields without corresponding flight data values; and calculating, by the one or more processors of the first user device, the flight data values corresponding to the one or more data fields.

3. The computer-implemented method of claim 1, further comprising:

determining, by the one or more processors of the first user device, to update at least one initial flight data value corresponding to at least one flight data field of the one or more flight data fields;

calculating, by the one or more processors of the first user device, at least one new flight data value corresponding to the at least one flight data field; and updating, by the one or more processors of the first user device, the at least one initial flight data value with the at least one new flight data value.

4. The computer-implemented method of claim 1, wherein the flight data includes one or more of: (i) an aircraft tail number; (ii) an origin airport; (iii) a destination airport; (iv) the present position of the aircraft; (v) the present speed of the aircraft; or (vi) an estimated time of arrival to the destination airport.

5. The computer-implemented method of claim 1, wherein the second user device includes at least one of: (i) a ground-based server; (ii) an electronic device associated with a medical professional; (iii) an electronic device associated with emergency personnel, or (iv) an electronic device associated with an airport.

6. The computer-implemented method of claim 1, further comprising:

analyzing, by the one or more processors of the first user device, the flight data associated with the medical emergency; and generating, by the one or more processors of the first user device, at least one recommendation for responding to the medical emergency, wherein the at least one recommendation is based on the analyzed flight data.

7. The computer-implemented method of claim 6, wherein the at least one recommendation is further based on a categorization of the medical emergency.

8. The computer-implemented method of claim 6, wherein generating the at least one recommendation for responding to the medical emergency includes generating a hospital recommendation for rerouting a flight path of the aircraft.

9. A computer system, comprising:

one or more processors; and a memory storing instructions that, when executed, cause the one or more processors to:

receive, at the computer system that is on-board an aircraft and via an application programming interface, an indication of a medical emergency aboard the aircraft;

retrieve, from a flight management system that is on-board the aircraft and responsive to receiving the indication of the medical emergency, flight data associated with the aircraft at a time of the medical emergency;

automatically categorize the retrieved flight data based at least on one or more flight data fields associated with the medical emergency to generate categorized flight data;

display, via a user interface of the computer system and responsive to receiving the indication of the medical emergency, the one or more flight data fields comprising the categorized flight data, each flight data field of the one or more flight data fields labeled with a respective flight data field label on the user interface, the one or more flight data fields comprising a present position of the aircraft and a present speed of the aircraft at the time of the medical emergency; and transmit at least some of the categorized flight data to a second user device external to the aircraft.

10. The computer system of claim 9, wherein the memory includes instructions that, when executed, further cause the one or more processors to:

identify, after automatically categorizing the retrieved flight data, one or more data fields without corresponding flight data values; and calculate the flight data values corresponding to the one or more data fields.

11. The computer system of claim 9, wherein the memory includes instructions that, when executed, further cause the one or more processors to:

determine to update at least one initial flight data value corresponding to at least one flight data field of the one or more flight data fields;

calculate at least one new flight data value corresponding to the at least one flight data field; and update the at least one initial flight data value with the at least one new flight data value.

12. The computer system of claim 9, wherein the flight data includes one or more of: (i) an aircraft tail number; (ii) an origin airport; (iii) a destination airport; (iv) the present position of the aircraft; (v) the present speed of the aircraft; or (vi) an estimated time of arrival to the destination airport.

13. The computer system of claim 9, wherein the second user device includes at least one of: (i) a ground-based server, (ii) an electronic device associated with a medical professional; (iii) an electronic device associated with emergency personnel, or (iv) an electronic device associated with an airport.

14. The computer system of claim 9, wherein the memory includes instructions that, when executed, further cause the one or more processors to:

analyze the flight data associated with the medical emergency; and generate at least one recommendation for responding to the medical emergency, wherein the at least one recommendation is based on the analyzed flight data.

15. The computer system of claim 14, wherein the at least one recommendation is further based on a categorization of the medical emergency.

16. The computer system of claim 14, wherein generating the at least one recommendation for responding to the medical emergency includes generating a hospital recommendation for rerouting a flight path of the aircraft.

17. A non-transitory computer-readable medium storing processor-executable instructions that, when executed by one or more processors, cause the one or more processors to at least:

receive, at the one or more processors included in a first user device that is on-board an aircraft and via an application programming interface, an indication of a medical emergency aboard the aircraft;

retrieve, from a flight management system that is on-board the aircraft and responsive to receiving the indication of the medical emergency, flight data associated with the aircraft at a time of the medical emergency;

automatically categorize the retrieved flight data based at least on one or more flight data fields associated with the medical emergency to generate categorized flight data;

display, via a user interface of the first user device and responsive to receiving the indication of the medical emergency, the one or more flight data fields comprising the categorized flight data, each flight data field of the one or more flight data fields labeled with a respective flight data field label on the user interface, the one or more flight data fields comprising a present position of the aircraft and a present speed of the aircraft at the time of the medical emergency; and transmit at least some of the categorized flight data to a second user device external to the aircraft.

18. The non-transitory computer-readable medium of claim 17, storing further instructions to:

identify, after automatically categorizing the retrieved flight data, one or more data fields without corresponding flight data values; and calculate the flight data values corresponding to the one or more data fields.

19. The non-transitory computer-readable medium of claim 17, storing further instructions to:

determine to update at least one initial flight data value corresponding to at least one flight data field of the one or more flight data fields;

calculate at least one new flight data value corresponding to the at least one flight data field; and update the at least one initial flight data value with the at least one new flight data value.

20. The non-transitory computer-readable medium of claim 17, storing further instructions to:

analyze the flight data associated with the medical emergency, and generate at least one recommendation for responding to the medical emergency, wherein the at least one recommendation is based on the analyzed flight data.

* * * * *